United States Patent
Brümmer et al.

(10) Patent No.: US 12,148,960 B2
(45) Date of Patent: Nov. 19, 2024

(54) COOLING METHOD FOR OPERATING A FUEL-CELL SYSTEM

(71) Applicant: MAHLE INTERNATIONAL GMBH, Stuttgart (DE)

(72) Inventors: Richard Brümmer, Stuttgart (DE); Thomas Strauss, Notzingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 0 days.

(21) Appl. No.: 18/569,872

(22) PCT Filed: Jun. 1, 2022

(86) PCT No.: PCT/EP2022/064951
§ 371 (c)(1),
(2) Date: Dec. 13, 2023

(87) PCT Pub. No.: WO2022/263181
PCT Pub. Date: Dec. 22, 2022

(65) Prior Publication Data
US 2024/0266561 A1 Aug. 8, 2024

(30) Foreign Application Priority Data
Jun. 14, 2021 (DE) .................. 102021206015.3

(51) Int. Cl.
*H01M 8/04007* (2016.01)
*H01M 8/04014* (2016.01)
(Continued)

(52) U.S. Cl.
CPC ... *H01M 8/04059* (2013.01); *H01M 8/04014* (2013.01); *H01M 8/04029* (2013.01);
(Continued)

(58) Field of Classification Search
CPC ......... H01M 8/04059; H01M 8/04014; H01M 8/04029; H01M 8/04768; H01M 8/04828;
(Continued)

(56) References Cited

U.S. PATENT DOCUMENTS
2002/0184901 A1 12/2002 Ishikawa
2004/0018405 A1 1/2004 Vuk et al.
(Continued)

FOREIGN PATENT DOCUMENTS
| DE | 102005010891 A1 | 11/2005 |
|---|---|---|
| DE | 102006048187 A1 | 4/2007 |
| EP | 3614474 | 2/2020 |
| JP | 2001313054 | 11/2001 |
| JP | 2007242280 | 9/2007 |
| KR | 20060069896 | 6/2006 |

OTHER PUBLICATIONS

English translation of Search Report issued in PCT/EP2022/064951 (Nov. 22, 2022).

*Primary Examiner* — Christian Roldan
(74) *Attorney, Agent, or Firm* — Barnes & Thornburg LLP

(57) ABSTRACT

The invention relates to a method for operating a fuel cell system, comprising a cooling circuit for cooling at least one fuel cell, wherein a coolant circulating in the cooling circuit is cooled with a coolant cooler, which also has air flowing through it. The air is supplied by a fan assembly. The fuel cell system also comprises an evaporative cooling unit, which, upstream of the coolant cooler, introduces water into the air supplied by the fan assembly. An increased efficiency of the fuel cell system alongside sufficient cooling of the at least one fuel cell is achieved in that the evaporative cooling unit introduces water at a maximum rate before the fan assembly reaches its maximum air mass flow. The invention also relates to a fuel cell system of this type, as well as a motor vehicle comprising a fuel cell system of this type.

11 Claims, 4 Drawing Sheets

Figure 1:
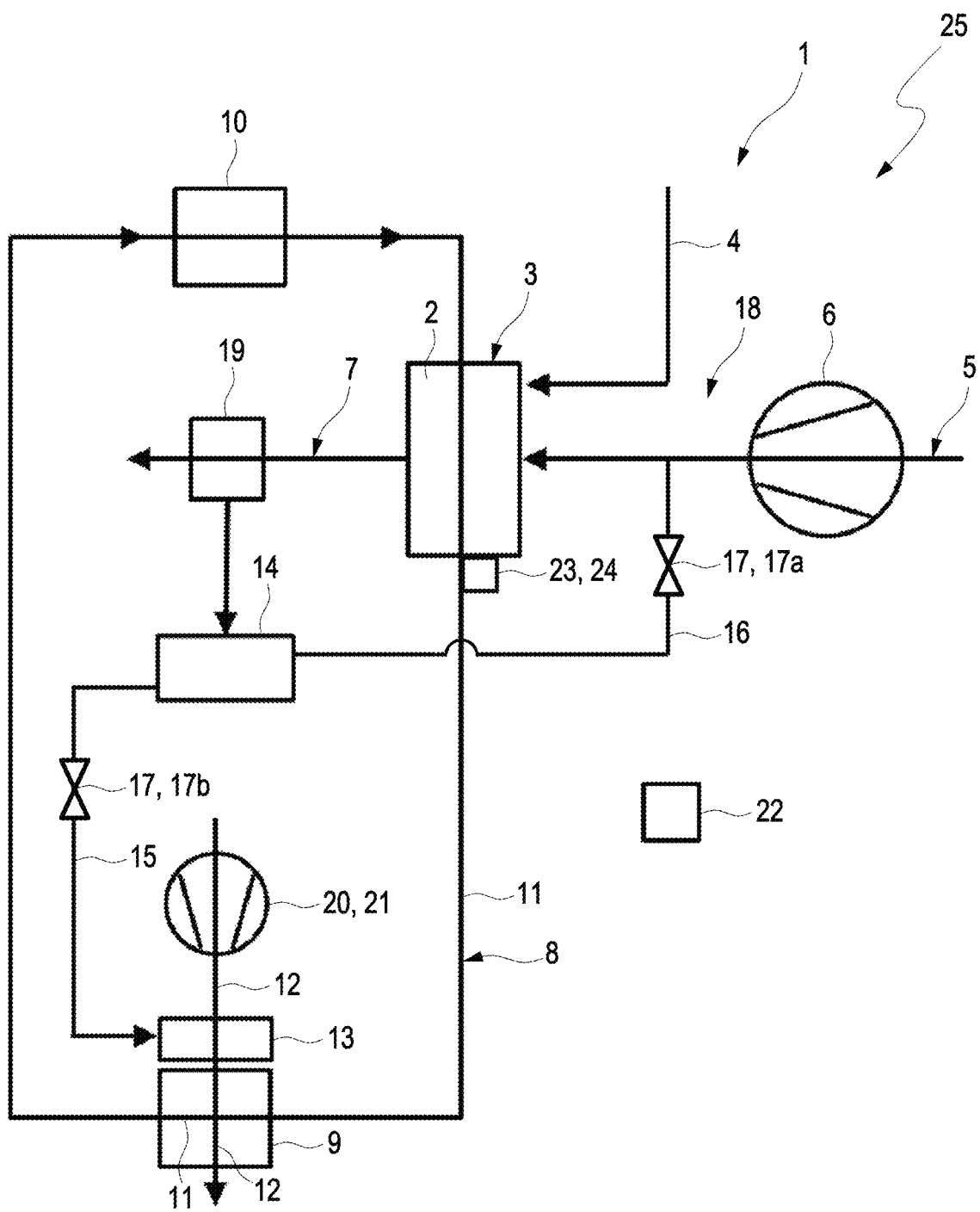

(51) Int. Cl.
*H01M 8/04029* (2016.01)
*H01M 8/0438* (2016.01)
*H01M 8/04701* (2016.01)
*H01M 8/04746* (2016.01)
*H01M 8/04828* (2016.01)

(52) U.S. Cl.
CPC ... *H01M 8/04768* (2013.01); *H01M 8/04828* (2013.01); *H01M 2250/20* (2013.01)

(58) Field of Classification Search
CPC ........... H01M 2250/20; H01M 8/0432; H01M 8/04417; H01M 8/04425; H01M 8/04723; H01M 8/04776
USPC ........................................................ 429/400
See application file for complete search history.

(56) References Cited

U.S. PATENT DOCUMENTS

| | | | |
|---|---|---|---|
| 2005/0199192 A1* | 9/2005 | Goebel | B60L 58/33 123/41.01 |
| 2006/0248906 A1* | 11/2006 | Burk | F25B 30/02 62/324.4 |
| 2007/0082245 A1 | 4/2007 | Druenert | |
| 2009/0214915 A1* | 8/2009 | Kwon | H01M 8/0258 429/437 |
| 2017/0141416 A1* | 5/2017 | Pandey | H01M 8/04059 |

\* cited by examiner

COOLING METHOD FOR OPERATING A FUEL-CELL SYSTEM

CROSS-REFERENCE TO RELATED APPLICATIONS

This application is a national stage application under 35 USC 371 of PCT Application No. PCT/EP2022/064951, filed on Jun. 1, 2022, which claims priority from German Patent Application No. DE 10 2021 206 015.3, filed on Jun. 14, 2021, the entirety of which are each fully incorporated by reference herein.

The present invention relates to a method for operating a fuel cell system, which comprises at least one fuel cell and a cooling circuit for cooling the fuel cell. Further, the invention relates to such a fuel cell system and to a motor vehicle having such a fuel cell system.

During the operation of a fuel cell, the fuel cell is supplied with a cathode gas and a fuel in order to generate electric energy. In the process, heat is generated. In an associated fuel cell system, multiple such fuel cells are generally combined into a stack. The heat development in the respective fuel cell or the stack can result in damage to the fuel cell or neighbouring components. In the associated fuel cell system, a cooling of the at least one fuel cell is therefore generally provided.

Usually, a cooling circuit is employed for this purpose, through which during the operation a coolant flows and cools the at least one fuel cell. In order to cool the coolant, coolant coolers are usually employed, which during the operation, are flowed through by coolant and, fluidically separated from the coolant, by a cooling gas, in the following also referred to as air. Thus, a heat transfer from coolant to the air takes place in the coolant cooler, so that the coolant is cooled.

It is known, further, to introduce water into the airflow upstream of the coolant cooler for increasing the cooling power of the coolant cooler, which water evaporates and, through the evaporation heat needed for this purpose, results in an additional cooling.

Usually, this takes place by means of a device which in the following is also referred to as evaporative cooling unit.

In order to vary the cooling of the coolant in the coolant cooler it is usual to vary the flow of the air flowing through the coolant cooler and/or a rate with which the evaporative cooling unit introduces water. In order to deliver air through the coolant cooler, at least one fan is generally employed. In order to vary the flow of the air through the coolant cooler it is thus possible to operate the fan with different outputs. The fan is configured for operating between a minimum output and a maximum output. When a maximum cooling of the at least one fuel cell is required, the fan is thus operated with the maximum possible output. The maximum possible output results in a correspondingly high energy consumption of the fan, which results in a reduced efficiency of the fuel cell system.

Since such fans are generally and increasingly driven electrically, they constitute in the entire fuel cell system or in an application, in which the fuel cell system is employed, an electric energy consumer. Thus, operating the fan results in correspondingly reduced total electric energy available.

In the case of mobile applications, for example in motor vehicles, the energy consumption of the fan results in correspondingly reduced maximally available electric power and/or in a reduced range.

The present invention therefore deals with the object of stating for a method for operating a fuel cell system of the type mentioned at the outset, for such a fuel cell system and for a motor vehicle having such a fuel cell system, improved or at least other embodiments, which are characterised in particular by an increased efficiency.

According to the invention this object is solved through the subjects of the independent claims. Advantageous embodiments are subject of the dependent claims.

The present invention is based on the general idea of increasing, in a fuel cell system which comprises a cooling circuit for cooling at least one fuel cell and a coolant cooler flowed through by air for cooling a coolant circulating through the cooling circuit for increasing the cooling power of the cooler, the flow of the air through the coolant cooler by means of at least one fan and increase the rate of water which is introduced into the air by means of an evaporative cooling unit, wherein these increases take place in such a manner that a maximum rate, with which water is introduced, is reached earlier than a maximum air mass flow which is achievable with the at least one fan. As a result, for reaching the maximum cooling power of the coolant cooler, the cooling power to be increased by means of the evaporative cooling unit is maximally utilised initially before the increase of the cooling power that is maximally possible with the at least one fan is used. The flow of the air provided even before the reaching of the air mass flow that is maximally deliverable with the at least one fan results in an increase of the cooling power achieved by means of the evaporation heat. Only when the cooling power thus reached is not sufficient, is the at least one fan for delivering the maximally possible air mass flow operated. This results in a reduced total or medium energy consumption of the at least one fan. This leads to an increased efficiency of the fuel cell system, wherein at the same time damage caused through increased temperatures of the at least one fuel cell are avoided or at least reduced. Thus, the maximally available output of the fuel cell system, in particular during peak loads, is increased. In mobile applications, in particular in a motor vehicle, this results in an increased operating duration and/or an increased maximally available power and in an increased range.

According to the inventive idea, the fuel cell system comprises at least one fuel cell, the cooling circuit, the coolant cooler, the at least one fan and the evaporative cooling unit. Advantageously, the fuel cell system comprises at least two, in particular multiple fuel cells which are combined into a stack. During the operation, coolant circulates through the cooling circuit. The at least one fuel cell is incorporated in the cooling circuit in such a manner that the coolant cools the at least one fuel cell. During the operation, the coolant and air, fluidically separated from the coolant, flows through the coolant cooler. During the operation, the coolant transfers heat to the air and is thus cooled. For delivering the air through the coolant cooler, the at least one fan is employed. Thus, the fuel cell system comprises a fan assembly comprising at least one fan. With the fan assembly, air is deliverable between a minimal air mass flow, in the following also referred to as minimum mass flow, and a maximal air mass flow, which in the following is also referred to as maximum mass flow. During the operation, the evaporative cooling unit introduces water, upstream of the coolant cooler, into the air delivered by the fan assembly. This takes place in such a manner that the water evaporates and thus extracts heat from the air and/or the coolant cooler. The water can be introduced into the air with a rate which in the following is also referred to as introduction rate. The evaporative cooling unit is configured in such a manner that water can be introduced between a minimal rate and a maximal rate, in the following also referred to as minimum rate and maximum rate. For increasing the cooling power of the coolant cooler the introduction rate and the air mass flow are increased. According to the invention, this takes place in such a manner that the maximum rate, with which water is introduced into the air, is reached before the maximum mass flow, which the fan assembly can deliver is reached.

For varying the introduction rate, any means can be basically provided.

It is conceivable to employ at least one valve for varying the introduction rate. Alternatively or additionally, the power of an associated delivery device, for example of a pump, of a compressor and the like can be changed for varying the introduction rate.

The changing of the air mass flow delivered with the fan assembly takes place by a corresponding change of a power with which the fan assembly is operated. The fan assembly is operable between a minimal power and a maximal power, which in the following is also referred to as minimum power and maximum power. For delivering the minimum mass flow, the fan assembly is thus operated with the minimum power and for delivering the maximum mass flow with the maximum power. The air mass flow and the fan output are practically substantially or approximately related cubically.

The changing of the air mass flow delivered with the fan assembly is practically achieved through a corresponding change of a rotational speed of the at least one fan. When the fan assembly comprises a single fan, the fan, for delivering the minimum mass flow is operated with a minimal rotational speed, in the following also referred to as minimum rotational speed, and for conveying the maximum mass flow, with a maximal rotational speed in the following also referred to as maximum rotational speed. When the fan assembly comprises two or more fans, this practically applies to the sum of the rotational speeds of the fans. This sum corresponds to a total rotational speed of the fans. Consequently, the fans for delivering the minimum mass flow are operated with a minimal total rotational speed, in the following likewise referred to as minimum rotational speed for simplification and for conveying the maximum mass flow with a maximal total rotational speed, in the following likewise referred to as maximum rotational speed for simplification. Likewise, the total rotational speed is likewise referred to as rotational speed for simplification. The rotational speed or the total rotational speed and the air mass flow are practically related substantially or approximately linearly.

The fan output between the minimum output and the maximum output results in an air mass flow through the coolant cooler increasing from the minimum output to the maximum output. Analogously to this, the operating of the fan assembly between the minimum rotational speed and the maximum rotational speed results in an increasing air mass flow through the coolant cooler.

By operating the fan assembly, air is actively delivered. It is possible that air flows through the coolant cooler even without using the fan assembly, for example by means of other delivery devices, by headwind and the like.

At least one of the at least one fan is advantageously operated electrically. This allows in particular a simple realisation and an autonomous operation of the fuel cell system.

Preferred are embodiments, in which the fan assembly is put into operation prior to the evaporative cooling unit. Altogether, this results in that the activation characteristic curve of the evaporative cooling unit is steeper than the activation characteristic curve of the fan assembly. Consequently, the fan assembly, prior to the introduction of water, is operated with the minimum rate for delivering an air mass flow, which corresponds at least to the minimum mass flow and is below the maximum mass flow. This air mass flow is also referred to as threshold mass flow in the following. The associated rotational speed is also referred to as threshold rotational speed in the following. Thus it is ensured that an airflow with the minimum rate is present prior to introducing water. As a result it is avoided that water remains on the fan assembly and/or on the coolant cooler or at least reduces the dwell duration of the water. Thus, damage caused by the water, which can be caused for example by corrosion and/or thermal stresses, is avoided or at least reduced. In addition, the water is thus at least partially transported by means of the airflow so that the cooling intended with the evaporative cooling unit generally occurs by means of the evaporation heat or with an increased efficiency. As a result, both at least reduced damage and also increased power and efficiency of the fuel cell system are achieved in this manner.

Basically, the threshold mass flow can correspond to any air mass flow. Similar applies to the threshold rotational speed.

Advantageously, the threshold mass flow is between 30% and 90% of the maximum mass flow. Preferably, the threshold mass flow is between 50% and 80% of the maximum mass flow. Thus, a sufficiently high airflow is achieved before water is introduced with the minimum rate. Accordingly, the said damage is effectively avoided and the efficiency of the fuel cell system effectively increased.

The inter-dependent operation of the fan assembly and of the evaporative cooling unit advantageously takes place dependent on the rotational speed of the fan assembly. Since the rotational speed is an easily adjustable and/or monitorable parameter, the operation of the fuel cell system can thus be realised easily and reliably.

The operation of the fan assembly for delivering with the threshold mass flow prior to introducing with the minimum rate is advantageously realised in such a manner that the evaporative cooling unit is operated dependent on the given rotational speed, i.e. on the actual value of the rotational speed, or dependent on the desired rotational speed, i.e. dependent on the setpoint value of the rotational speed. In other words, the introduction rate is coupled to the actual value and/or to the setpoint value of the rotational speed. This results in a simple and reliable operation of the fuel cell system.

It is advantageous when the introduction rate and the rotational speed are approximately related cubically. In a particularly advantageous embodiment, their dependency corresponds at least in regions to a cubic parabola section. Thus, it is taken into account in particular that the fan output is substantially dependent cubically on the rotational speed of the at least one fan. In other words, a coupling between the airflow and the introduction rate is achieved, which results in an efficient utilisation of the evaporation heat for increasing the cooler output and an effective reduction of the said damage.

A simplified adaptation of the introduction rate can be achieved by a proportional valve. Alternatively or additionally, an on/off valve, i.e. a valve that is adjustable in steps, can be employed. Then, a change of the supply of the evaporative cooling unit with water can be realised by throttling. Alternatively or additionally, the pressure in a water reservoir storing the water can be changed and/or a variable delivery device, e.g. a variable pump be employed.

On reaching the threshold mass flow or the threshold rotational speed, a substantially abrupt increase of the evaporation water mass flow can occur. Thus, the fuel cell system can be easily and cost-effectively realised, in particular produced.

The introduction rate corresponds to a water quantity introduced per unit time.

Basically, the entire water quantity introduced during the introduction of water with the maximum rate per unit time can be constant.

It is also conceivable that the total water quantity per unit time introduced during the introduction of water with the maximum rate is adapted depending on parameters of the fuel cell system and/or of the environment and/or of the associated application. Thus, it is possible in particular, dependent on the said parameters, which in the following are also referred to as state parameters, to adjust the respective cooling power required. This results in an improved efficiency of the fuel cell system. These state parameters include for example the ambient temperature, the ambient humidity, the water supply of evaporation water and the air mass flow through the coolant cooler.

Preferably, the fan assembly and/or the evaporative cooling unit are merely put into operation in particular when a corresponding cooling of the at least one fuel cell is required. This means that the increase of the cooling power of the coolant cooler achieved by means of the fan assembly and/or evaporative cooling unit are merely employed in particular when a variable, which correlates to the temperature of the at least one fuel cell, exceeds a lower threshold value. Thus it is avoided, in particular, that the fan assembly and/or the evaporative cooling unit are unnecessarily operated. This results in an increased efficiency of the fuel cell system.

Advantageously, the fan assembly is put into operation above the lower limit value in order to deliver air. It is preferred when the fan assembly delivers air between the minimum mass flow and maximum mass flow above the lower limit value dependent on a setpoint value of the variable.

Advantageously, the fan assembly is put into operation when the lower limit value is exceeded. This means that the fan assembly above the lower limit value delivers air between the minimum mass flow and maximum mass flow.

Advantageously, the operation of the fan assembly is stopped when the lower limit value is undershot. Thus, with values of the variable below the lower limit, the fan assembly advantageously does not deliver any air.

It is conceivable upon a sudden drop of the variable below the lower limit value to continue operating the fan assembly for a duration, in particular predetermined duration in order to deliver air through the coolant cooler. In doing so, the knowledge is utilised that upon a sudden undershooting of the lower limit value a sudden drop of the air mass flow occurs. Upon the low and absent flow through the coolant cooler thus provided it can happen that evaporation water remains in the coolant cooler over an extended period of time. The consequence could be corrosion and/or freezing of the evaporation water. To counteract this, the fan assembly is thus continued to be operated for the duration, in order to let the evaporation water evaporate and/or be transported away. This drying process can be promoted and/or even accelerated by a simultaneous flow of the coolant through the coolant cooler.

It is preferred, further, when the evaporative cooling unit with values of the variable below the lower limit is not operated, i.e. does not actively introduce any water. It is conceivable to continue operating the evaporative cooling unit when the lower limit is undershot and/or when the at least one fuel cell is shut down or deactivated, in particular upon standstill and/or slow travel of the associated motor vehicle in order to deliver water out of the evaporative cooling unit. When doing so, the knowledge is utilised that water remaining in the evaporative cooling unit over an extended period of time can cause damage, in particular through corrosion and/or freezing. This is counteracted by the post-operation of the evaporative cooling unit in order to drive the water out of the evaporative cooling unit, in order to prevent a possible freezing of the water and/or corrosion. This takes place in particular at ambient temperatures of lower than 5° C. and/or dependent on whether data and/or dependent on the current time of year and/or location. The draining of water can take place for example by opening at least valve and/or through intentional leakages in at least one valve.

Preferred are embodiments, in which the value to be reached and thus the setpoint value of the variable in at least one range between the minimum mass flow and the maximum mass flow depends on the actual value of the air mass flow or on a related parameter, such as for example the rotational speed and/or the fan output.

In preferred embodiments, the setpoint value up to a limit mass flow between the minimum mass flow and the maximum mass flow is substantially constant and rises above the limit mass flow up to an upper limit value of the variable. This limit mass flow according to the above explanation is reached at a corresponding limit of the rotational speed, which in the following is also referred to as limit rotational speed. This results in that the air mass flow, from the lower limit value of the variable, up to the limit mass flow is increased in such a manner in order to keep the setpoint value substantially constant. Above the limit mass flow, an increase of the setpoint value of the variable up to the upper limit value is permitted. In other words, the said range is delimited and thereby defined by the limit mass flow up to the maximum mass flow. Thus, in particular during operating peaks, in which peak power generated by means of the at least one fuel cell is required, and in which in the prior art the fan assembly delivers the maximum mass flow constantly, reaching the maximum mass flow is delayed. Thus, the maximum energy consumption of the fan assembly is delayed. This results in increased energy available for other applications in particular during peak loads. Thus, the electric energy that is available for an associated application is thus increased in particular at peak loads. In addition, this results in a reduced mean energy consumption of the fan assembly.

It is preferred when the fan assembly, on reaching the upper limit value of the variable, delivers air with the maximum mass flow.

The increase of the air mass flow from the limit mass flow to the maximum mass flow can basically take place in any way. In particular, the air mass flow can be abruptly increased from the limit mass flow, i.e. in one step, to the maximum mass flow.

It is preferred when the air mass flow above the limit mass flow is increased up to the maximum mass flow. It is conceivable, in particular, to increase the air mass flow above the limit mass flow up to the maximum mass flow in a constant, multi-step, continuous and similar manner.

In advantageous embodiments, the limit mass flow is between 30% and 90% of the maximum mass flow. Particularly preferably, the limit mass flow is between 50% and 80% of the maximum mass flow. Thus, an increased efficiency of the fuel cell system and the avoidance or at least reduction of damage to the at least one fuel cell are achieved with a reduced energy consumption of the fan assembly.

Advantageous are embodiments, in which the setpoint value in the region increases linearly with the air mass flow and thus with the rotational speed. This means that the dependency of the setpoint value on the air mass flow and consequently on the rotational speed in the range can be represented in the manner of a cubic parabola section. By doing so it is taken into account in particular that the output of the fan assembly is related approximately cubically to the air mass flow and consequently to the rotational speed. This results in a reliable cooling of the coolant, wherein at the same time damage to the at least one fuel cell is avoided or at least reduced.

The threshold mass flow is practically smaller than the limit mass flow. Accordingly, the threshold rotational speed is lower than the limit rotational speed.

It is conceivable, in particular, that the maximum rate is introduced when the limit mass flow is reached. In other words, when the limit mass flow is reached, the increase of the cooling power of the coolant cooler achieved by means of the evaporative cooling unit is increased. This results in that the variable above the limit mass flow rises less sharply. Consequently, an increase of the air mass flow is prevented or at least delayed. As a result, the energy required and consumed by the fan assembly is further reduced.

For carrying out the method, the fuel cell system can be configured as desired. In particular, the fuel cell system can comprise a control device which is configured accordingly.

The fuel cell system can be employed in any application. It is conceivable in particular to employ the fuel cell system in a mobile application, for example in a motor vehicle. In this case, the fuel cell system, in particular one fuel cell, can serve for driving the motor vehicle.

It is to be understood that besides the method, such a fuel cell system and such an application, in particular such a motor vehicle, can each also be part of the scope of this invention.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

It shows, in each case schematically

FIG. 1 a greatly simplified representation of a fuel cell system in the manner of a circuit chart, FIGS. 2 to 6 a chart each for explaining a method for operating the fuel cell system.

A fuel cell system 1, such as is shown for example in FIG. 1 in a greatly simplified manner in the form of a circuit chart comprises at least one fuel cell 2. In the shown exemplary embodiment, the fuel cell system 1 comprises multiple fuel cells 2, which are combined into a stack 3. During the operation, the at least one fuel cell 2 requires a fuel and a cathode gas, for example air. The fuel is supplied to the stack 2 via a fuel supply system 4. The cathode gas is supplied to the at least one fuel cell 2 with the help of a cathode gas supply system 5. For delivering the cathode gas to the at least one fuel cell 2, the cathode gas supply system 5 comprises a delivery device 6 which in the following is also referred to as cathode gas delivery device 6. The cathode gas delivery device 6 can compress the cathode gas for delivering the cathode gas. During the operation of the at least one fuel cell 2, exhaust gas is created which contains water, in particular steam. This exhaust gas is discharged with the help of an exhaust system 7 of a motor vehicle 25. During the operation of the at least one fuel cell 2, heat is developed, further, so that during the operation of the motor vehicle 25 a cooling of the at least one fuel cell 2 can be required.

For cooling the at least one fuel cell 2, the fuel cell system 1 comprises a cooling circuit 8, through which during the operation a coolant circulates. The at least one fuel cell 2, in the shown exemplary embodiment the stack 3, is incorporated in the cooling circuit 8 in such a manner that it is cooled by the coolant during the operation. For cooling the coolant, the fuel cell system 1 comprises a cooler 9 which in the following is also referred to as coolant cooler 9. The coolant cooler 9 is likewise incorporated in the cooling circuit 8 and during the operation flowed through by coolant. The cooling circuit 8 practically comprises further components for example a delivery device 10 for delivering the coolant through the cooling circuit 8, in the following also referred to as coolant delivery device 10, which are incorporated in the cooling circuit 8. Thus, a flow path 11 of the coolant, in the following also referred to as coolant path 11, leads through the cooling circuit 8. For cooling the coolant, air as a cooling gas is employed. The air flows through the coolant cooler 9 along an associated flow path 12, in the following also referred to as cooling gas path 12, fluidically separated from the coolant, so that in the coolant cooler 9 the coolant, fluidically separated from the air, transfers heat to the air and is thus cooled.

To improve the cooling of the coolant, the fuel cell system 1 additionally comprises an evaporative cooling unit 13, with which on the coolant cooler 9 and downstream of the coolant cooler 9 water can be introduced in the cooling gas path 12. Thus, an evaporation of the water occurs resulting in an increased cooling of the coolant in the coolant cooler 9. The evaporative cooling unit 13 can introduce water between a minimum rate 32 and a maximum rate 33 (see FIG. 2) into the cooling gas path 12. An introduction rate 29 (see FIG. 2) of the water introduced by means of the evaporative cooling unit 13 is thus adjustable between the minimum rate 32 and the maximum rate 33. The water supplied to the evaporative cooling unit 3 originates, in the shown exemplary embodiment, from a water reservoir 14, in which water extracted from the exhaust gas is collected. The water collected in the water reservoir 14 can be extracted from the exhaust gas for example by means of a water separator 19 provided in the exhaust system 7. For supplying the evaporative cooling unit 13 with water, a flow path 15 leads from the water reservoir 14 to the evaporative cooling unit 13, wherein this flow path 15 is also referred to as evaporation path 15 in the following.

For introducing the water between the minimum rate 32 and the maximum rate 33 by means of the evaporative cooling unit 13, the water is subjected to pressure. In the exemplary embodiment shown in FIG. 1, this takes place purely exemplarily by means of the cathode gas delivery device 6. For this purpose, a flow path 16 of the cathode gas leads on the pressure side of the cathode gas delivery device 6, to the water reservoir 14, wherein this flow path 16 is also referred to as compressed-air path 16 in the following. For varying the introduction rate, at least one valve 17 of a valve device 18 can be employed. In the shown exemplary embodiment, a valve 17a and/or a valve 17b is arranged in the compressed-air path 16 and in the evaporation path 15 respectively.

The air delivered through the coolant cooler 9 is delivered by means of a fan assembly 20, which comprises at least one electrically operated fan 21. In the shown exemplary embodiment, it is purely exemplarily assumed that the fan assembly 20 comprises a single fan 21. In order to vary the flow of the air through the coolant cooler 9, the air mass flow 28 through the coolant cooler 9 (see FIG. 2) delivered with the fan assembly 20 is changed. The fan assembly 20 can deliver air between a minimal air mass flow 30, in the following also referred to as minimum mass flow 30 and a maximal air mass flow 31, in the following also referred to as maximum mass flow 31. In the shown exemplary embodiment, the air mass flow 28 is linearly related to a rotational speed of the fan 21.

For varying the cooling power of the coolant cooler 9, the air mass flow 28 and the introduction rate 29 are suitably varied. For increasing the cooling power, the air mass flow 28 and/or the introduction rate 29 are increased. This takes place for example by means of a control device 22, which is suitably configured and connected to the fan assembly 20 (not shown) in a communicating manner. Advantageously, the control device 22 is additionally connected to the valve device 18 in a communicating manner. In the shown exemplary embodiment, the fuel cell system 1, further, comprises a device for determining a variable, which correlates to the temperature of the at least one fuel cell 2, wherein the device 23 is also referred to as variable detection device 23 in the following. In the shown exemplary embodiment, the variable detection device 23 is a temperature sensor 24, which determines the temperature of the at least one fuel cell 2, in particular of the stack 3, and/or the temperature of the coolant, in the shown exemplary embodiment downstream of the at least one fuel cell. In the shown exemplary embodiment, the variable is thus the temperature of at least one of the at least one fuel cells 3 and/or the temperature of the coolant downstream of the at least one fuel cell 2. The variable detection device 23 is likewise connected to the control device 22 in a communicating manner.

Operating the fuel cell system 1, which can be employed for example in a motor vehicle 25 which is not shown, in order to drive the motor vehicle 25, is explained in the following by way of charts shown in the FIGS. 2 to 6. In the charts, the introduction rate 29 and the air mass flow 28 are shown dimensionless as percentage of their respective maximum value.

Figure 2:
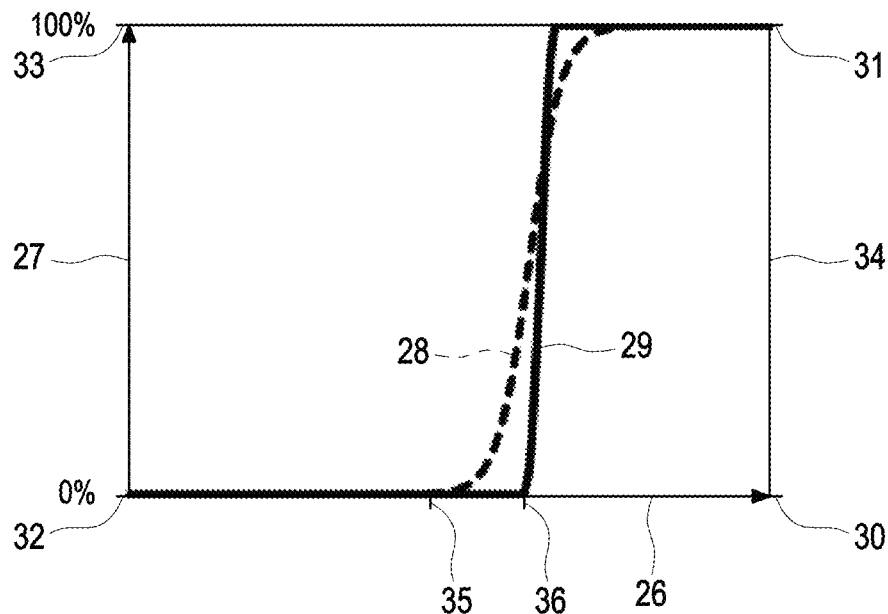

Here, FIG. 2 shows a chart in which along the abscissa axis 26 the said variable, in particular the temperature of the at least one fuel cell 2, is plotted. Along the ordinate axis 27, a percentage is plotted, wherein with a dashed line the said percentage air mass flow 28 and with a continuous line the said percentage introduction rate 29 are plotted. According to FIG. 2, the air mass flow 28 between the minimum mass flow 30 is at 0% and the maximum mass flow 31 at 100%. Because of the substantially linear relationship between the air mass flow 28 and the rotational speed, the shown percentage curve of the air mass flow 28 and thus the characteristic curve of the air mass flow 28 substantially corresponds to the percentage curve or the characteristic curve of the rotational speed. Analogously to this, the introduction rate 29 between the minimum rate 32 is at 0% and of the maximum rate 33 at 100%. As is evident from FIG. 2, both the air mass flow 28 and also the introduction rate 29 are increased with increasing variable in order to increase the cooling power of the coolant cooler 9. As is further evident from FIG. 2, the maximum rate 33 is reached earlier than the maximum mass flow 31.

As is further evident from FIG. 2, the fan assembly 20 in the shown exemplary embodiment is put into operation before the evaporative cooling unit 13. This means that the fan assembly 20, prior to introducing water with the minimum rate 32, delivers air with a percentage air mass flow 34 corresponding at least to the minimum mass flow 30, wherein this air mass flow 34 is also referred to as threshold mass flow 34 in the following. Conversely, this means that the evaporative cooling unit 13 introduces water with the minimum rate 32 into the air only upon reaching the threshold mass flow 34. As is likewise evident from FIG. 2, this results in that the characteristic curve of the introduction rate 29 follows a steeper course than the characteristic curve of the air mass flow 28 and thus than the characteristic curve of the rotational speed. As is evident from FIG. 2, the threshold mass flow 34 is between 30% and 90% of the maximum mass flow 31, preferably between 50% and 80% of the maximum mass flow 31, in the shown exemplary embodiment approximately 45% of the maximum mass flow 31.

As is likewise evident from FIG. 2, the increase of the cooling power achieved by means of the fan assembly 20 and the evaporative cooling unit 13 takes place only in particular when the variable and thus the temperature of the at least one fuel cell 2 exceeds a lower limit value 35. The fan assembly 20 is operated for delivering with the minimum mass flow I 30 when the lower limit 35 is exceeded. The above description results in that the evaporative cooling unit 13 is put into operation and water introduced with the minimum rate 32 when the variable reaches or exceeds a limit value 36, which in the following is also referred to as intermediate limit value 36. It is preferred here when the fan assembly 20 is operated dependent on the determined variable. Further it is preferred when the evaporative cooling unit 13 and thus the introduction rate 29 is adjusted dependent on the air mass flow 28, advantageously dependent on the rotational speed. While the air mass flow 28 and consequently the rotational speed is thus coupled to the variable, the introduction rate 29 is coupled to the air mass flow 28 and consequently the rotational speed and thus indirectly to the variable.

Thus, the fan assembly 20 is operated above the lower limit value 35 dependent on a setpoint value of the variable for delivering an air mass flow 28 between the minimum mass flow 30 and the maximum mass flow 31.

Figure 3:
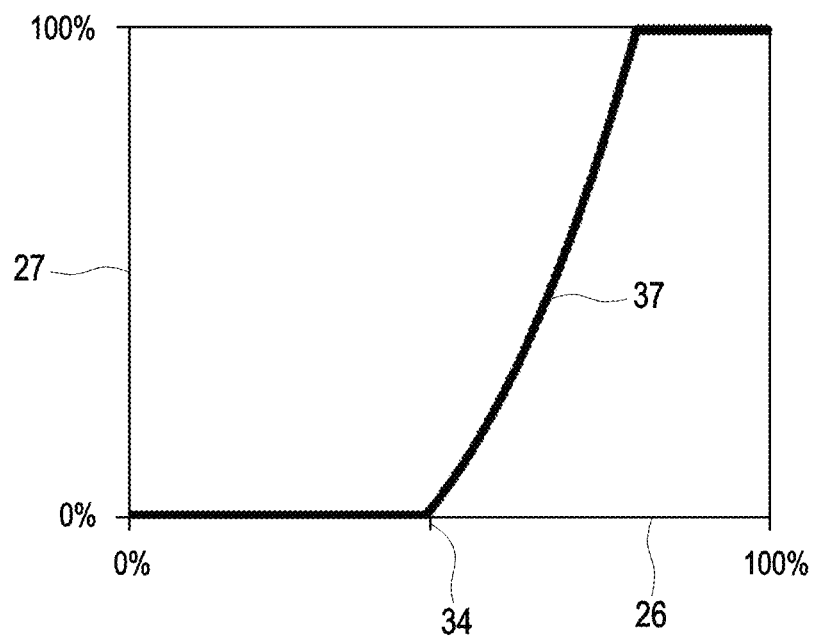

FIG. 3 shows a further chart, in which along the ordinate axis 26 the air mass flow 28 or analogously thereto, the rotational speed and along the abscissa axis 27, the introduction rate 29 is plotted by percentage in each case. As is evident from FIG. 3, there is in sections a substantially cubic relationship between the percentage air mass flow 28 and the introduction rate 29. In this section, which is delimited between the threshold mass flow 34 and the maximum rate 33 the characteristic curve 37 shown in FIG. 3 thus runs substantially as a parabola section. This takes into account in particular that the output of the fan assembly 20 is cubically related to the rotational speed and thus to the delivered air mass flow.

Figure 4:
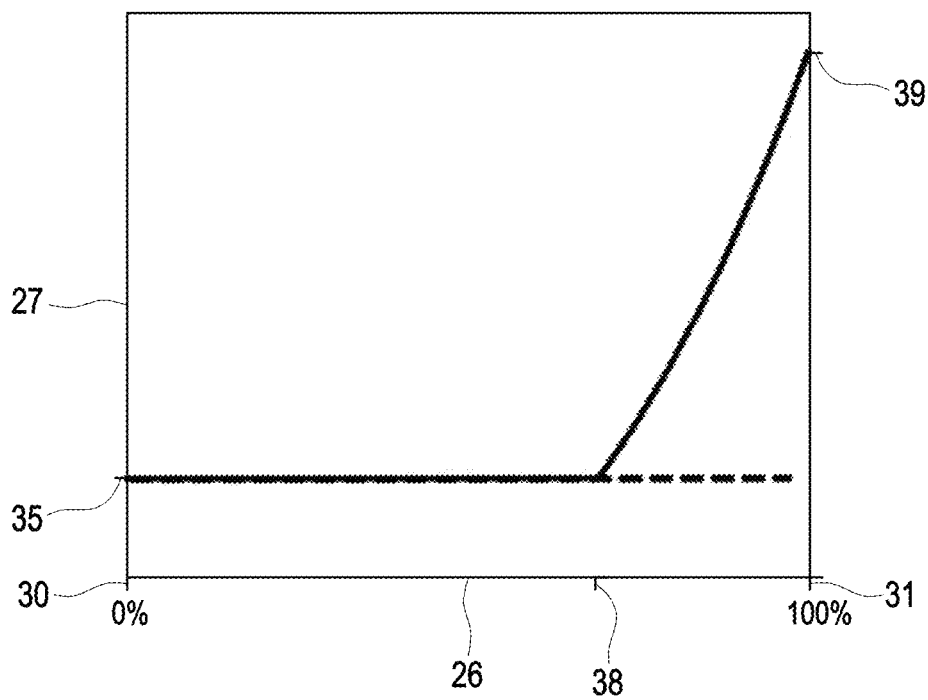
Figure 5:
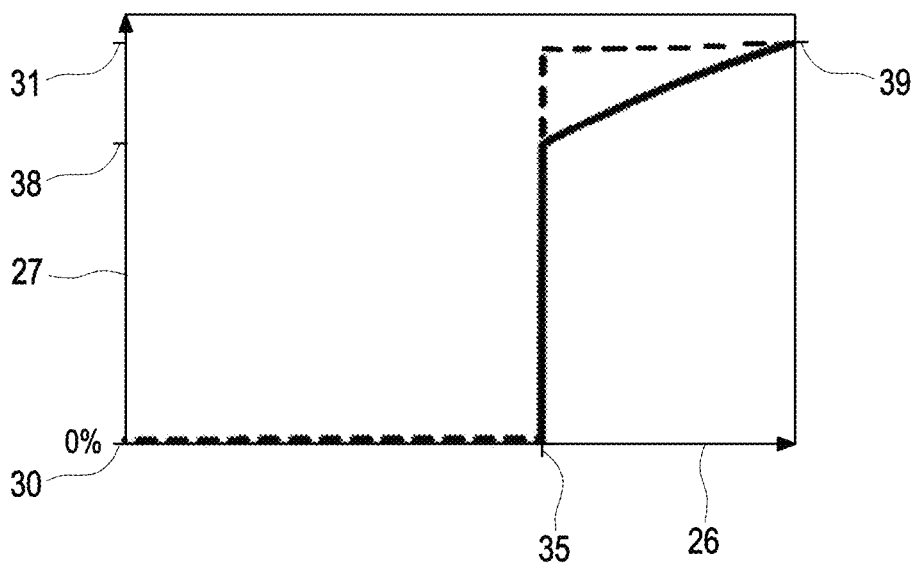
Figure 6:
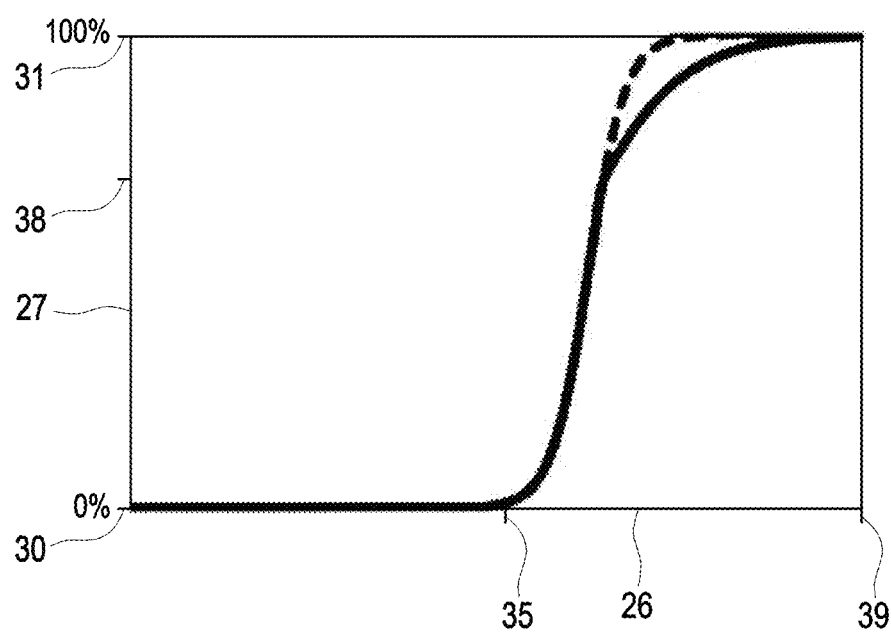

According to the FIGS. 4 to 6, the value of the variable to be achieved and thus the setpoint value of the variable can be made dependent in at least a range between the minimum mass flow 30 and the maximum mass flow 31 on the actual value of the air mass flow 28 and consequently on the rotational speed. FIG. 4 shows a chart, in which along the abscissa axis 26 the percentage air mass flow 28 and along the ordinate axis 27 the setpoint value of the variable are plotted. FIG. 5 shows a chart, in which along the abscissa axis 26 the actual value of the variable and along the ordinate axis 27 the air mass flow 28 are plotted. FIG. 6 shows a chart, in which along the abscissa axis 26 the actual value of the variable and along the ordinate axis 27 the air mass flow 28 is plotted.

In the exemplary embodiment shown in the FIGS. 4 to 6, it is provided that the setpoint value is substantially constant up to a limit 38 of the air mass flow 28, in the following also referred to as limit mass flow 38 and above the limit mass flow 38 increases up to an upper limit value 39 of the variable. The threshold mass flow 34 is practically smaller than the limit mass flow 38. The corresponding characteristic curves are shown in the FIGS. 4 to 6 by a continuous line. By contrast, the comparison with the prior art is shown in dashed line in the FIGS. 4 to 6. As is evident in the FIGS. 4 to 6, a delay pending the reaching of the maximum mass flow 31 thus materialises compared with the prior art, in which the setpoint value of the variable is preferably kept constant over the entire available air mass flow 28 and thus between the minimum rotational speed 30 and the maximum rotational speed 31. Here, the upper limit value 39 of the variable correlates with such a temperature at least of one of the at least one fuel cell 2, the exceeding of which would result in a permanent damage of the at least one fuel cell 2. Adapting the setpoint value to the air mass flow 28 in the range can take place by means of the characteristic curve shown in FIG. 6 and thus based on the characteristic curve.

As is evident, further, from the FIGS. 4 to 6, the fan assembly 20, in the shown exemplary embodiment, is operated for delivering with the maximum mass flow 31 when the upper limit value 39 of the variable is reached. The increase of the air mass flow 28 takes place above the limit mass flow 38 up to a maximum mass flow 31. In the exemplary embodiment shown in FIG. 5, there is a relationship between the air mass flow 28 or the rotational speed and the variable in the range between the limit mass flow 38 and the maximum mass flow 31 according to a cubic root function in sections.

In the exemplary embodiment shown in FIG. 6, a square or cubic relationship in the manner of a parabola section is provided between the air mass flow 28 and the actual value of the variable in the range, i.e. between the limit mass flow 38 and the maximum mass flow 31.

As is evident from FIG. 4, there is preferably in the range, i.e. between the limit mass flow 38 and the maximum mass flow 31, an approximately cubic relationship between the air mass flow 28 and the setpoint value of the variable, in particular in the manner of a parabola section. Through the cubic relationships it is taken into account in particular that the fan output of the fan assembly 20 is approximately cubically related to the air mass flow 28 and thus to the rotational speed of the fan assembly 20.

As is evident from the FIGS. 4 to 6, the limit mass flow 38 in the shown exemplary embodiments and preferably is between 30% and 90% of the maximum mass flow 31, particularly preferably between 50% and 80% of the maximum mass flow 31. In the shown exemplary embodiments, the limit mass flow 38 is 70% of the maximum mass flow 31.

Viewing the FIGS. 2 to 5 together it is noticeable that the threshold mass flow 34 is smaller than the limit mass flow 38. The same applies to the associated rotational speeds.

As is evident in particular from FIG. 2, the maximum rate 33 of the introduction rate 29 is preferably already introduced when the limit mass flow 38 is reached. As a result, the increase of the cooling power of the coolant cooler 9 achieved by means of the evaporative cooling unit 13 is preferably completely exhausted before the reaching of the maximum mass flow 31. This results in that the variable above the limit mass flow 38 increases less sharply. As a result, the phase, from which the fan assembly 20 is operated for delivering with the maximum mass flow 31, is further delayed or shortened. This results in a further reduced energy consumption of the fan assembly 20.

If in the region a permanent damage of the at least one fuel cell 2 threatens, the adaptation of the setpoint value of the variable to the air mass flow 28 is advantageously suspended and/or interrupted in order to deliver air with the maximum mass flow 31. This can be achieved for example by adjusting the setpoint value to a safety value which is smaller than the upper limit value 39 and greater or equal to the lower limit value 35 (not shown). In particular, the setpoint value can be adjusted to the safety limit value when in the region a predetermined or determined maximum duration of the increase of the setpoint value is exceeded, and/or when the electric power incurred on at least one of the at least one fuel cells 2 decreases.

With the operating method, the described fuel cell system 1 and the motor vehicle 25, there is a reliable cooling of the at least one fuel cell 2 with an increased efficiency. In particular, a reduced energy consumption of the fan assembly 20 materialises in this way. Since the fan assembly 20 is operated electrically, there is also altogether more electric energy available for the associated application, here the motor vehicle 25. Besides an increased available power, this also results in an increased range of the motor vehicle 25.

The specification can be readily understood with reference to the following Numbered Paragraphs:

Numbered Paragraph 1: A method for operating a fuel cell system (1), wherein the fuel cell system (1) comprises:
  at least one fuel cell (2),
  a cooling circuit (8) through which during the operation a coolant circulates and into which the at least one fuel cell (2) for cooling the fuel cell (2) is incorporated,
  a coolant cooler (9), through which during the operation the coolant flows and through which, fluidically separated from the coolant, air flows in order to cool the coolant,
  a fan assembly (20) comprising at least one fan (21) for delivering the air through the coolant cooler (9), which during the operation delivers air with an air mass flow (28) between a minimum mass flow (30) and a maximum mass flow (31), an evaporative cooling unit (13), with which water with an introduction rate (29) between a minimum rate (32) and a maximum rate (33) can be introduced upstream of the coolant cooler (9) into the air delivered by the fan assembly (20),
  wherein the introduction rate (29) and the air mass flow (28) are increased for increasing the cooling power of the coolant cooler (9),
  wherein the introduction rate (29) and the air mass flow (28) are increased in such a manner that the maximum rate (33) is reached before the maximum mass flow (31).

Numbered Paragraph 2. The method according to Numbered Paragraph 1, characterised in that the fan assembly (20), before the introduction of water with a minimum rate (32), delivers air with a threshold mass flow (34), which corresponds at least to the minimum mass flow (30) and is less than the maximum mass flow (31).

Numbered Paragraph 3. The method according to Numbered Paragraph 2, characterised in that the threshold mass flow (34) is between 30% and 90% of the maximum mass flow (31).

Numbered Paragraph 4. The method according to Numbered Paragraph 3, characterised in that the threshold mass flow (34) is between 50% and 80% of the maximum mass flow (31).

Numbered Paragraph 5. The method according to any one of the Numbered Paragraphs 2 to 4, characterised in that water is introduced with the introduction rate (37) between the minimum rate (32) and the maximum rate (33) dependent on the actual value or setpoint value of the air mass flow (28).

Numbered Paragraph 6. The method according to any one of the Numbered Paragraphs 1 to 5, characterised in that the introduction rate (37) in at least one section is cubically related to the air mass flow (28).

Numbered Paragraph 7. The method according to any one of the Numbered Paragraphs 1 to 6, characterised in that during the introduction of water, a water quantity introduced with the maximum rate (33) is dependent on state parameters of the fuel cell system (1) and/or of the environment.

Numbered Paragraph 8. The method according to any one of the Numbered Paragraphs 1 to 7, characterised
in that the fan assembly (20) is put into operation above a lower limit value (35) of a variable, which correlates to the temperature of the at least one fuel cell (2), in order to deliver air,
in that the fan assembly (20), above the lower limit value (35), delivers an air mass flow (28) dependent on a setpoint value of the variable, between the minimum mass flow (30) and the maximum mass flow (31),
in that the setpoint value is dependent on the actual value of the air mass flow (28) at least in a range between the minimum mass flow (30) and the maximum mass flow (31).

Numbered Paragraph 9. The method according to Numbered Paragraph 8, characterised
in that the setpoint value is constant up to a limit mass flow (38) of the air mass flow (28) between the minimum mass flow (30) and the maximum mass flow (31) and above the threshold mass flow (34),
in that the setpoint value above the limit mass flow (38) increases up to an upper limit value (39) of the variable.

Numbered Paragraph 10. A fuel cell system (1), in particular for a motor vehicle (25),
having at least one fuel cell (2),
having a cooling circuit (8), through which during the operation a coolant circulates and into which the at least one fuel cell (2) is incorporated for cooling the fuel cell (2),
having a coolant cooler (9), through which during the operation the coolant flows and through which, fluidically separated from the coolant, air flows in order to cool the coolant,
having a fan assembly (20) comprising at least one fan (21), which during the operation delivers air through the coolant cooler (9), with which air with an air mass flow (28) between a minimum mass flow (30) and a maximum mass flow (31) can be delivered,
having an evaporative cooling unit (13), which during the operation introduces water upstream of the coolant cooler (9) with an introduction rate (29) between a minimum rate (32) and a maximum rate (33) into the air delivered by the fan assembly (20),
having a control device (22) which is configured in such a manner that it operates the fuel cell system (1) according to a method in accordance with one of the Numbered Paragraphs 1 to 9.

Numbered Paragraph 11. A motor vehicle (25) having a fuel cell system (1) according to Numbered Paragraph 10.

The invention claimed is:

1. A method for operating a fuel cell system,
wherein the fuel cell system comprises:
at least one fuel cell,
a cooling circuit through which during the operation a coolant circulates and into which the at least one fuel cell for cooling the fuel cell is incorporated,
a coolant cooler, through which during the operation the coolant flows and through which, fluidically separated from the coolant, air flows in order to cool the coolant,
a fan assembly comprising at least one fan for delivering the air through the coolant cooler, which during the operation delivers air with an air mass flow between a minimum mass flow and a maximum mass flow, and
an evaporative cooling unit, in which water with an introduction rate between a minimum rate and a maximum rate can be introduced upstream of the coolant cooler into the air delivered by the fan assembly,
wherein the introduction rate of water and the air mass flow are increased for increasing the cooling power of the coolant cooler, and
wherein the introduction rate of water and the air mass flow are increased in such a manner that the maximum rate is reached before the maximum mass flow.

2. The method according to claim 1, wherein the fan assembly, before the introduction of water with a minimum rate, delivers air with a threshold mass flow, which corresponds at least to the minimum mass flow and is less than the maximum mass flow.

3. The method according to claim 2, wherein the threshold mass flow is between 30% and 90% of the maximum mass flow.

4. The method according to claim 3, wherein the threshold mass flow is between 50% and 80% of the maximum mass flow.

5. The method according to claim 2, wherein water is introduced with the introduction rate between the minimum rate and the maximum rate dependent on an actual value or setpoint value of the air mass flow.

6. The method according to claim 1, wherein the introduction rate in at least one section is cubically related to the air mass flow.

7. The method according to claim 1, wherein as water is introduced to the evaporative cooling unit, a water quantity introduced with the maximum rate is dependent on state parameters of the fuel cell system and/or of an environment of the fuel cell system.

8. The method according to claim 1, wherein
the fan assembly is put into operation above a lower limit value of a variable, which correlates to a temperature of the at least one fuel cell, in order to deliver air,
the fan assembly, above the lower limit value, delivers an air mass flow dependent on a setpoint value of the variable, between the minimum mass flow and the maximum mass flow, and
the setpoint value is dependent on an actual value of the air mass flow at least in a range between the minimum mass flow and the maximum mass flow.

9. The method according to claim 8, wherein the setpoint value is constant up to a limit mass flow of the air mass flow between the minimum mass flow and the maximum mass flow and above a threshold mass flow, and the setpoint value above the limit mass flow increases up to an upper limit value of the variable.

10. A fuel cell system, in particular for a motor vehicle, comprising at least one fuel cell, a cooling circuit, through which during the operation a coolant circulates and into which the at least one fuel cell is incorporated for cooling the fuel cell, a coolant cooler, through which during the operation the coolant flows and through which, fluidically separated from the coolant, air flows in order to cool the coolant, a fan assembly comprising at least one fan, which during the operation delivers air through the coolant cooler, with which air with an air mass flow between a minimum mass flow and a maximum mass flow can be delivered, an evaporative cooling unit, which during the operation introduces water upstream of the coolant cooler with an introduction rate between a minimum rate and a maximum rate into the air delivered by the fan assembly, and a control device which is configured in such a manner that it operates the fuel cell system according to a method in accordance with claim 1.

11. A motor vehicle comprising having a fuel cell system according to claim 10.

\* \* \* \* \*